Oct. 20, 1936.    R. S. SANFORD    2,057,744
CLUTCH MECHANISM
Filed Nov. 6, 1933    4 Sheets-Sheet 1
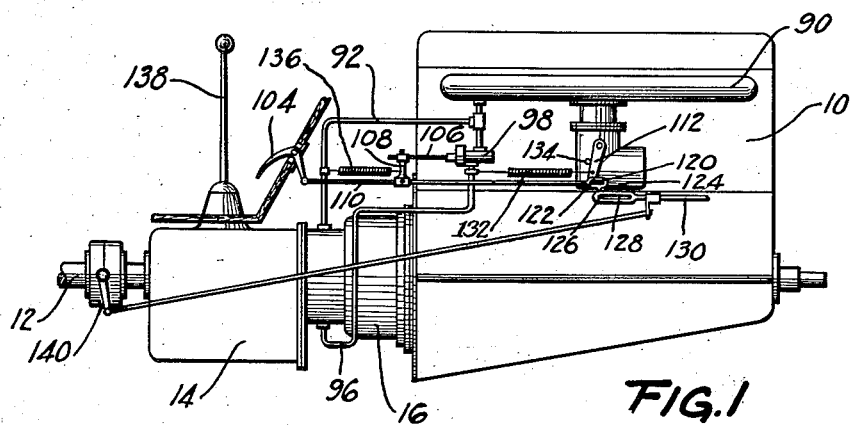
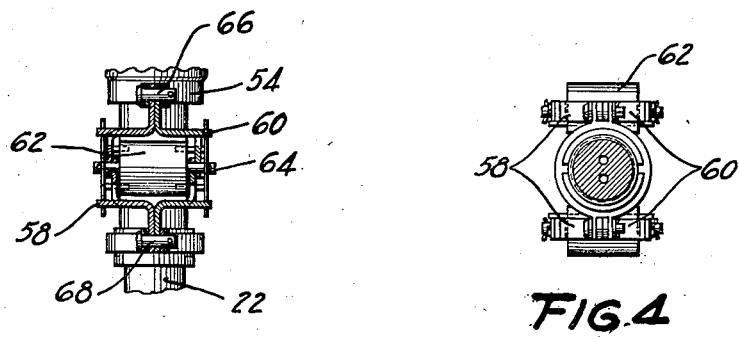
INVENTOR.
ROY S. SANFORD
BY
ATTORNEY

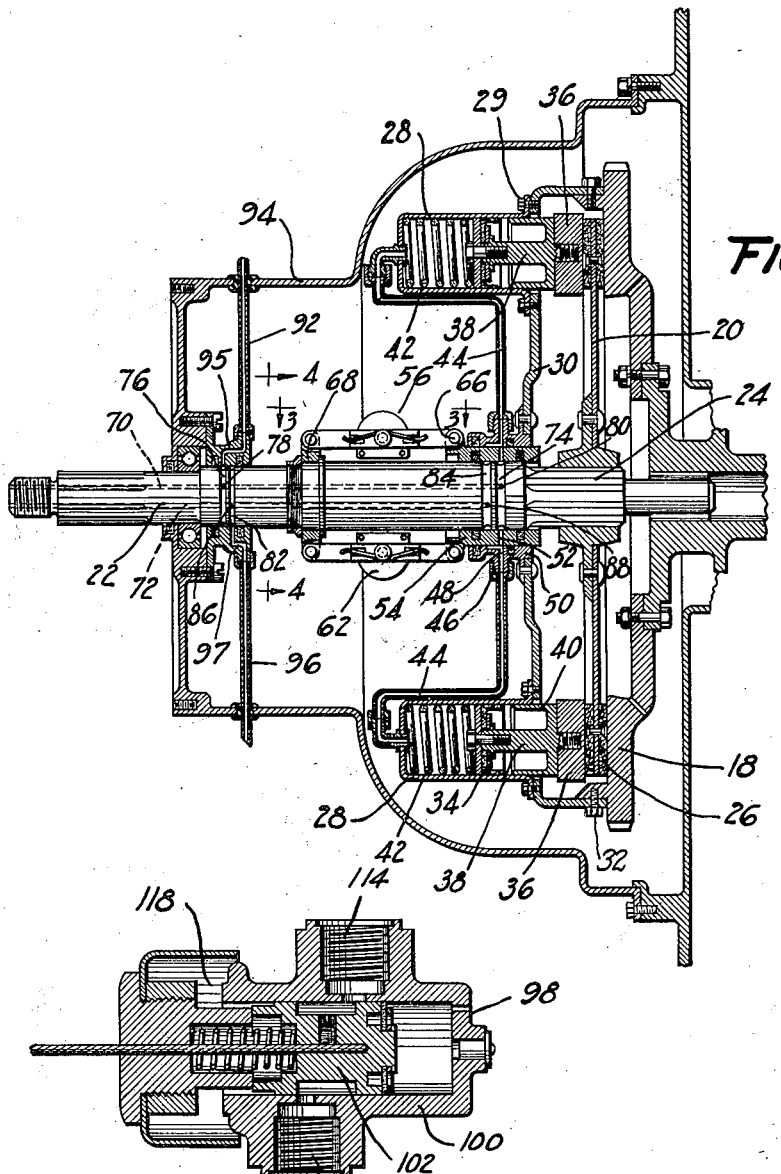

Oct. 20, 1936.   R. S. SANFORD   2,057,744
CLUTCH MECHANISM
Filed Nov. 6, 1933   4 Sheets-Sheet 3

INVENTOR.
ROY S. SANFORD
BY H.O.Clayton
ATTORNEY

Oct. 20, 1936.   R. S. SANFORD   2,057,744
CLUTCH MECHANISM
Filed Nov. 6, 1933   4 Sheets-Sheet 4

INVENTOR.
Roy S. SANFORD
BY H. O. Clayton
ATTORNEY

Patented Oct. 20, 1936

2,057,744

UNITED STATES PATENT OFFICE 2,057,744

CLUTCH MECHANISM

Roy S. Sanford, New York, N. Y., assignor to Bendix Aviation Corporation, South Bend, Ind., a corporation of Delaware Application November 6, 1933, Serial No. 696,767

16 Claims. (Cl. 192—.01)

This invention relates to automotive vehicles and in particular to the clutch mechanism thereof interconnecting the internal-combustion engine with the change-speed transmission.

It is the principal object of the invention to provide vacuum operated means for controlling the engagement and disengagement of the clutch, said means being preferably built into the clutch housing and forming, together with the driving and driven elements of the clutch, a single compact unit.

A further object of the invention is to provide a clutch unit comprising a plurality of vacuum cylinders angularly spaced about and fixedly secured to the driving element of the clutch, said units housing spring operated piston elements operably connected to a clutch pressure plate.

Another object of the invention relates to the provision of a clutch and clutch operating mechanism built into a single unit wherein the usual manually operated clutch throw-out collar and actuating lever are replaced by a vacuum motor comprising a cylinder and piston.

A further object of the invention is to provide a so-called balanced type of control valve mechanism for a clutch operating vacuum motor wherein the motor may be progressively deenergized to engage the clutch by an intermittent operation of a manually operated valve operating means.

Yet another object of the invention is to provide means for energizing and deenergizing the aforesaid vacuum cylinders by alternately connecting the same with the intake manifold of the engine and with the atmosphere, said connection being effected by valve means controlled in part manually and in part by speed responsive means.

A further object of the invention is to provide vacuum means for controlling the engagement and disengagement of the clutch, said means being controlled by two separate connections with the intake manifold of the engine and by two valve means, one operated manually and preferably connected to the accelerator and the other operated automatically by centrifugal means responsive to the speed of the drive shaft.

Yet another object of the invention is to provide selectively operable means for rendering the aforementioned vacuum means inoperative to disengage the clutch when the drive shaft speed exceeds a predetermined R. P. M., yet permitting the vacuum means to automatically disengage the clutch at closed throttle when the R. P. M. of the shaft is below the aforementioned critical factor.

Yet another object of the invention is to provide a plurality of yieldable means for engaging the clutch, each of said means constituting a part of a vacuum operated motor unit, each of said units adapted, when energized, to compress its spring and thus disengage the clutch.

Other objects of the invention and desirable details of construction and combinations of parts will become apparent from the following detailed description of several embodiments of the invention, taken in conjunction with the accompanying drawings, in which:

Figure 1 is a diagrammatic view disclosing the general arrangement of the elements going to make up the invention;

Figure 2 is a vertical sectional view of the clutch structure constituting the essence of the invention;

Figure 3 is a view looking in the direction of the arrows 3—3 of Figure 2 and disclosing, in section, the centrifugal valve operating mechanism;

Figure 4 is a sectional view taken on the line 4—4 of Figure 2 and disclosing other details of the aforementioned centrifugal mechanism;

Figure 5 is a sectional view of the primary control valve of Figure 1 disclosing the details thereof;

Figure 6:
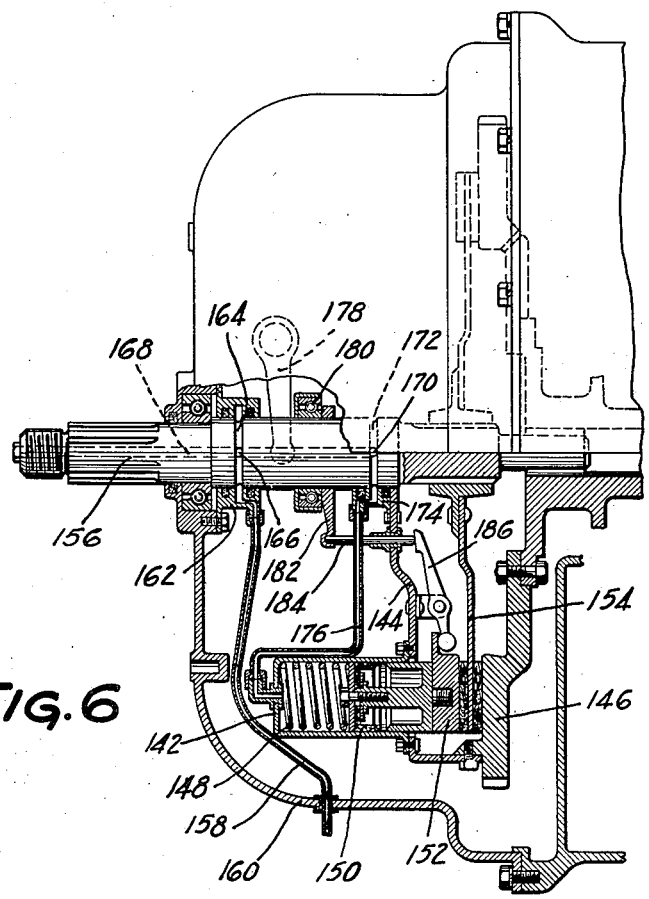
Figure 6 is a vertical sectional view, similar to Figure 2, of a modified form of combined vacuum operated means and clutch.

In that embodiment of the invention selected for illustration there is disclosed in Figure 1 a conventional internal-combustion engine 10 coupled to a drive shaft 12 by a conventional change-speed transmission 14, the latter being connected to the engine by a clutch mechanism 16 constituting the essence of the present invention.

The clutch mechanism is disclosed in detail in Figure 2, the major elements of which comprise an engine driven flywheel or clutch member 18 constituting the driving element of the clutch and a bodily movable member 20 constituting the driven element of the clutch and drivably connected to a jackshaft 22 by a splined connection 24. The driven clutch member is provided at its periphery with friction facings 26 adapted, when said member is moved bodily to the right, to contact the rotor flywheel member at its peripheral inner face to thereby engage the clutch and complete the driving engagement with the jackshaft and the transmission connected thereto to thus propel the vehicle. The invention is particularly directed to means for controlling the movement of the driven clutch member to engage and disengage the clutch, and in the embodiment of the invention disclosed in Figure 2 said means comprises a plurality of cup-shaped cylinder members 28 angularly spaced about and fixedly secured at 29 to a stamping 30, the latter secured to the flywheel by fastenings 32.

Each cylinder member 28 constitutes the housing element of a vacuum operated motor or so-called actuator, the power element of each of the motors comprising a reciprocable piston 34 secured to an annular pressure plate 36 by a connecting link 38, the latter being provided with a guide flange 40. Each actuator is provided with a spring 42, the several springs functioning as clutch springs and normally forcing the piston assembly to the right to force the pressure plate 36 into engagement with the facings 26 to maintain the clutch engaged. Each of the cylinder members 28 is provided at the closed end thereof with a conduit 44 extending to a fitting 46 interconnecting the several conduits with angular shaped ports 48 in a collar member 50 secured to the stamping 30. The ports 48 are adapted to register with ports 52 in a valve member 54, the latter being slidably mounted on the driven jackshaft 22 and reciprocated by means of a centrifugally operated mechanism 56. The latter mechanism comprises upper and lower pairs of angular shaped bracket members, each pair of members comprising two-part links 58 and 60, Figure 3, shaped to house a spring pressed centrifugal weight member 62, a pivot pin 64 extending through the member 62 and into the overlapping ends of the links. The links are pivotally connected at one end 66 to the slide valve member 54 and at their other end to a collar 68 drivably connected with the shaft 22.

The jackshaft 22 is provided with a plurality of parallel bores 70 and 72, bore 70 being interconnected with annular grooves 74 and 76 in the shaft by means of cross bores 78 and 80 and bore 72 being interconnected with grooves 82 and 84 in the shaft by means of cross bores 86 and 88. Groove 76 is connected directly to the intake manifold 90 of the engine by a conduit 92 extending through a clutch housing member 94 and groove 82 is also connected to the manifold by means of a collar 95 fixed to the housing 94 and a conduit 96 connected with a port 97 in the collar and extending through the closure. Three-way valve member 98, shown in detail in Figure 5, is interposed in the conduit 96, said valve comprising a casing member 100, the latter housing a reciprocable spool-shaped piston member 102 secured to an accelerator pedal 104 by links 106 and 108, the latter being secured to a link 110 interconnecting the accelerator with a throttle operating lever 112. The valve casing 100 is provided with ports 114 and 116 connected respectively to the manifold and vacuum cylinders respectively and with an atmospheric port 118. When the accelerator is released the valve member 102 is moved to interconnect the manifold with the vacuum cylinders 28 via the ports 114 and 116, and upon depressing the accelerator the cylinders 28 are vented to the atmosphere via port 118 in the valve. One end of the throttle operating link 110 is preferably slotted at 120 to receive a pin 122 on one end of the lever 112, the slotted portion 120 preferably being extended to provide an arm 124 having a pin 126 at its end extending through a slot 128 on one end of a link 130, the latter extending to the steering wheel or other part of the vehicle readily accessible to the driver. A spring 132 serves to normally urge the throttle operating lever 112 against a stop 134, and a spring 136 serves to normally urge the accelerator 104 and throttle link 110 to the left against the pin 126 as a stop.

Describing now the operation of the clutch controlling mechanism, upon cranking the engine, the accelerator being released, there is developed a manifold vacuum of approximately twenty inches of mercury at sea level. At this time the piston 102 of the three-way valve 98 is positioned to interconnect the manifold 90 with the groove 84 in the shaft 22 via conduit 96, groove 82, cross bore 86, bore 72 and cross bore 88, and the manifold is directly connected with the cylinder members 28 via conduit 92, groove 76, cross bores 78 and 80 and connecting bore 70, groove 74, ports 52 in the slide valve member 54, ports 48 in the collar member 50 and conduits 44. The driven jackshaft being at rest with the car stationary, the centrifugal governor mechanism is inoperative, resulting in the positioning of the valve member 54 as disclosed in Figure 2. The cylinders are consequently evacuated, resulting in a movement of the pistons 34 to the left to relieve the pressure of the springs 42 upon the pressure plate 36 and hence disengage the clutch.

The transmission is now placed in gear by the usual shift lever 138 and the accelerator depressed to speed up the engine and accelerate the vehicle. The manifold vacuum is automatically reduced with opening of the throttle, thus de-energizing the cylinders, which are directly connected with the manifold via the conduit 92, and permitting the springs 42 to engage the clutch, the mode of engagement being determined by the mode of operation of the throttle to reduce the vacuum in the manifold and cylinders. The size of the several ports and conduits will determine the rate of influx of air into the cylinders and thus determine the rate of engagement of the clutch.

After the clutch is engaged and the shaft 22 has reached a predetermined R. P. M. the centrifugally operated weights 62 move outwardly to force the valve 54 to the left and thus interconnect the groove 84 with the ports 48 by means of the ports 52 in the valve. Upon release of the accelerator prior to shifting the gears the clutch is again disengaged, this time the connection with the manifold being via the three-way valve 98.

There are thus provided two separate and distinct branch fluid transmitting circuits from the manifold to the vacuum cylinders, one of said circuits being controlled exclusively by the throttle and the centrifugal or speed responsive means and the other by the three-way valve 98 and the centrifugal means. This construction has utility however, for it will be noted that the operator may move the hand operated link 130 to the position of Figure 1 whereby the contact between the pin 126 and slotted end 128 prevents a complete release of the accelerator to operate the valve 98. Therefore, with the car in motion and the drive shaft rotating above the critical speed to cut off the direct connection with the manifold, the clutch may not be disengaged by the vacuum means. In starting the car, however, the centrifugal means is inoperative and the direct connection with the manifold, via conduit 92, effects an automatic disengagement of the clutch with the cranking of the engine. Thus the automatic operation of the clutch may be cut out at will when the vehicle is in motion to permit the engine to act as a brake.

If desired, a conventional free wheeling or so-called overrunning clutch unit 140 may be incorporated in the drive shaft 12 at the rear of the transmission to thereby isolate the latter when the clutch is disengaged and facilitate the shifting of the gears. This unit is preferably locked out by means secured to the link 130. Therefore, both valve 98 and unit 140 are simultaneously locked out to permit the above described braking action of the engine.

There is disclosed in Figure 6 an alternative form of so-called built-in clutch operating mechanism. In this design a plurality of angularly spaced cylinders 142 are fixedly secured to a stamping 144, the latter fixedly secured to a flywheel 146. Each cylinder houses a clutch spring 148 and piston 150, the latter connected to a pressure plate 152 disconnectedly engaging a friction faced stator or driven clutch element 154 drivably connected to a jackshaft 156. A power fluid transmitting connection between the cylinders and a common control valve, not shown, for the cylinders comprises a conduit 158 extending through a clutch housing 160, a ported collar 162 fixed to the housing 160, a groove 164, cross bore 166, bore 168, cross bore 170 and groove 172 all in the shaft 156, a ported collar 174 fixed to the stamping 144, and conduits 176. The aforementioned undisclosed control valve may be similar in construction and mode of operation to the valve 98 of Figure 1. In the event of the failure of the vacuum power mechanism, or for other reasons, the clutch may be manually disengaged, and to this end there is provided force transmitting linkage comprising a manually operated yoke 178, throw-out bearing 180, thrust plate 182, compression pins 184, and levers 186, the latter acting on the pressure plate 152 to compress the springs 148.

Describing now the operation of the mechanism of Figure 6, with release of the accelerator the cylinders 142 are connected with the manifold to thereby energize the same and disengage the clutch: upon depression of the accelerator the atmosphere is bled back into the cylinders at a rate depending upon the size and proportion of the several ports and conduits, thus effecting an engagement of the clutch.

Figure 7:
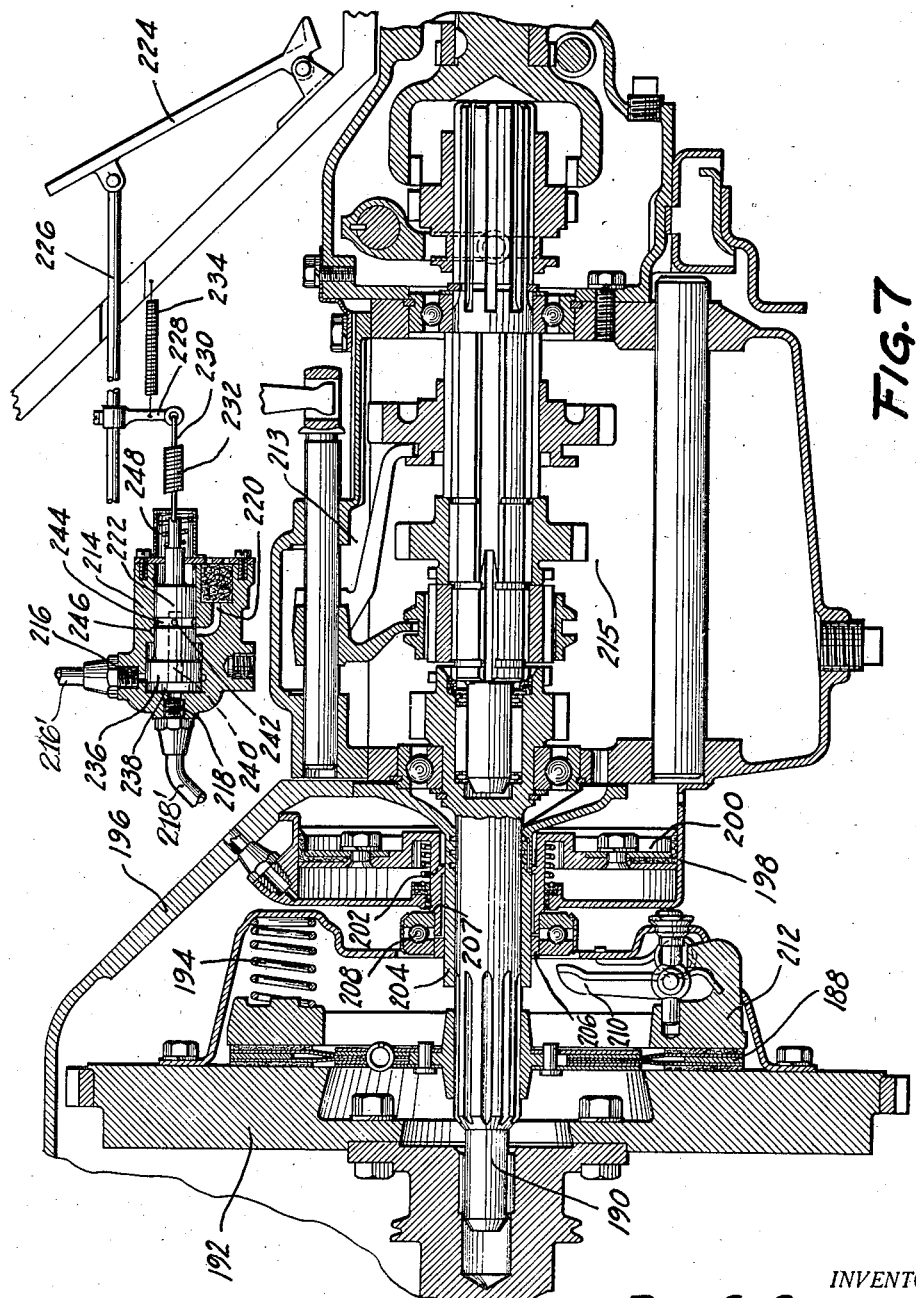
Figure 7 discloses yet another form of clutch operating mechanism built into the clutch unit, a cooperating change-speed transmission also being shown in section.

There is disclosed in Figure 7 yet another form of built-in clutch operator wherein a clutch stator member 188, slidably keyed to a drive shaft 190, is pressed into engagement with clutch rotor flywheel member 192 by clutch springs 194. A clutch operating vacuum operated motor is housed or built within a clutch housing 196, said motor comprising a cylinder member 198 fixedly secured to the housing 196, and further comprising a reciprocable piston member 200. The piston is provided with an elongated hub portion sleeved over the shaft 190 to thereby provide a structure obviating any possible cocking effect of the piston. The hub portion is composed of a sleeve 202 fixedly mounted on a collar member 204 by a nut 206, a shouldered portion 207 of the sleeve adapted to contact a ball throw-out bearing 208, contactible with clutch fingers 210 acting on a pressure plate 212. A change-speed transmission is connected with the shaft 190, said transmission comprising unshiftable mechanism 213 and an intermeshing gear train 215, the parts of which are disclosed in the figure. A control valve for the clutch motor is disclosed in detail in Figure 7 and comprises a casing 214 ported at 216, 218 and 220 for connection with the manifold via a conduit 216', the vacuum motor via a conduit 218' and the atmosphere respectively. A reciprocable piston member 222, housed within the casing 214, is connected with an accelerator 224 by throttle link 226 and links 228 and 230, the latter having incorporated therein a tension spring 232 weaker than a return spring 234. The valve piston is provided with a head portion 236 slidable within a compartment 238 in the casing, said compartment being vented to the atmosphere via bores 240 and 242 in the piston, grooves 244 and 246 in the piston and casing respectively, and port 220.

Describing the operation of the valve with the accelerator released and the engine dead, the compartment 238 is at atmospheric pressure and the valve 240 is drawn completely to the right by the spring 234. When the engine is cranked the manifold is evacuated, thereby evacuating the left side of the compartment 238 and the vacuum motor, resulting in a disengagement of the clutch and a movement of the valve piston 240 to the left to expand spring 232. The valve piston is then in equilibrium under the action of a compressed return spring 248 and a pressure differential acting on the valve, these two effects being balanced by the action of the spring 232. When it is desired to engage the clutch the accelerator is slightly depressed, thereby reducing the tension of the spring 232 and permitting the valve 240 to move to the left to register groove 244 with port 220. The vacuum motor is thus vented to the atmosphere to reduce the absolute pressure within the same and permit the clutch springs 198 to expand. If the operator holds the accelerator pedal in its applied position, the piston 240 will move to the right to close off the interconnection between the groove 244 and atmosphere when the absolute pressure in the left side of the compartment 238 is of such a degree as to place the system in equilibrium. There is thus provided a so-called follow-up to-lap action of the valve, the cylinder 198 being deenergized to gradually engage the clutch by successive increments of movement of the accelerator. When the piston head 236 bottoms in the valve casing the spring 232 is completely contracted and the clutch is fully engaged. It will be noted that the reverse action of the valve is effected by successively releasing the accelerator to thereby gradually disengage the clutch. However, in practice the accelerator is usually completely released at one time to quickly disengage the clutch, the aforementioned control being employed only to engage the clutch.

There is thus provided a compact and stable vacuum motor having no parts in motion when the clutch is either engaged or disengaged, and which provides an effective structure for the usual manually operated clutch throw-out collar. In all three of the suggested embodiments of the invention there is provided a compact and effective vacuum operated power mechanism built into the clutch housing and operating directly upon the conventional clutch springs.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:
1. In an automotive vehicle provided with a clutch comprising driving and driven elements, means for controlling the driving engagement of said elements one with another, said means comprising a plurality of angularly spaced vacuum controlled actuators fixedly secured to said driving element, the power elements of said actuators being operatively connected to said driven element and adapted to force the same into contact with the driving element.

2. In an automotive vehicle provided with a clutch comprising driving and driven elements, means for forcing said driven element into driving contact with said driving element comprising a plurality of vacuum controlled actuators secured to said driving element and operatively connected to said driven element.

3. In an automotive vehicle provided with an accelerator and a clutch comprising driving and driven elements, means for controlling the driving engagement between said elements comprising a plurality of vacuum controlled actuators secured to said driving element and having their power elements operatively connected to said driven element, and further comprising accelerator operated valve means for controlling the actuators.

4. In an automotive vehicle, a clutch provided with driving and driven elements, means for controlling the engagement and disengagement of the driven element with the driving element comprising a plurality of vacuum controlled motors fixedly secured to the driving element, each motor comprising a cylinder member, a power element housed within said cylinder member and operatively connected with the clutch driven element, and a spring interposed between one end of said cylinder element and the power element and normally energizing said power element to force the driven element into driving engagement with the driving clutch element.

5. In an automotive vehicle, a clutch provided with driving and driven elements, means for controlling the engagement and disengagement of the driven element with the driving element comprising a plurality of vacuum controlled motors fixedly secured to the driving element, each motor comprising a cylinder member, a power element housed within said cylinder member and operatively connected with the clutch driven element, and a spring interposed between one end of said cylinder element and the power element and normally energizing said power element to force the driven element into driving engagement with the driving clutch element, together with a common valve means operable to simultaneously effect the evacuation of all of said vacuum motors to compress their respective springs and disengage the clutch.

6. In an automotive vehicle provided with an accelerator, and further provided with a clutch having driving and driven elements, means for controlling the engagement and disengagement of the driven element with the driving element comprising a plurality of vacuum controlled motors fixedly secured to the driving element, each motor comprising a cylinder member, a reciprocable piston within said cylinder member operatively connected with the clutch driven element, and a compression spring within said cylinder normally functioning to energize the piston element to force the driven clutch element into driving engagement with the driving clutch element, together with an accelerator operated valve means operable to simultaneously effect the energization of said vacuum motors to compress their respective springs and effect a disengagement of the clutch.

7. Clutch operating mechanism for an automotive vehicle provided with an intake manifold and a clutch having driving and driven members, said mechanism comprising vacuum operated means secured to said driving member, and means for controlling the operation of said vacuum means comprising two fluid transmitting connections interconnecting said vacuum means and manifold.

8. Clutch operating mechanism for an automotive vehicle provided with an intake manifold and a clutch having driving and driven members, said mechanism comprising vacuum operated means secured to said driving member, and means for controlling the operation of said vacuum means comprising two separate fluid transmitting connections interconnecting said vacuum means and manifold, one of said connections being directly connected to the manifold and the other of said connections being indirectly connected to the manifold through the intermediary of a three-way valve.

9. Clutch control mechanism for an automotive vehicle having an intake manifold, a driven shaft and driving and driven clutch members, said mechanism comprising vacuum operated means secured to the driving clutch member, and means for controlling the operation of said vacuum operated means comprising fluid transmitting connections interconnecting the manifold with said means, and a plurality of valves incorporated in said connections, one of said valves being manually operated and the other automatically operated by means responsive to the speed of the driven shaft.

10. Clutch control mechanism for an automotive vehicle provided with an intake manifold and a clutch, power means for controlling the disengagement and engagement of the clutch, said power means including two fluid transmitting circuits interconnecting the power means and manifold, one of said circuits being effective to energize the power means to disengage the clutch when the vehicle is static or in motion below a predetermined speed and the other of said circuits being effective to energize said power means to disengage the clutch when the vehicle is in motion at or above a predetermined speed.

11. In a clutch control mechanism for an automotive vehicle provided with an intake manifold, an accelerator and a clutch, power means for controlling the operation of the clutch, said means comprising a plurality of vacuum operated actuators, and means for controlling the operation of said actuators comprising a plurality of fluid transmitting connections interconnecting the manifold and actuators, one of said connections being controlled by an accelerator operated valve and further controlled by a centrifugally operated valve and the other of said connections being controlled by said centrifugally operated valve.

12. In a clutch control mechanism for an automotive vehicle provided with an intake manifold, an accelerator and a clutch, power means for controlling the operation of the clutch, said means comprising a plurality of vacuum operated actuators, and means for controlling the operation of said actuators comprising a plurality of fluid transmitting connections interconnecting the manifold and actuators, one of said connections being controlled by an accelerator operated valve and further controlled by a centrifugally operated valve and the other of said connections being controlled by said centrifugally operated valve, together with means for disabling the operation of said first mentioned valve by the accelerator.

13. In an automotive vehicle provided with a clutch having driving and driven members, an intake manifold and a drive shaft driven by said clutch driven member, power means for controlling the engagement and disengagement of the clutch members, said power means comprising a plurality of actuators fixedly mounted on said clutch driving member and further comprising fluid transmitting connections interconnecting the manifold and actuators, said connections including a portion of said drive shaft.

14. Clutch controlling mechanism for an automotive vehicle provided with a clutch comprising driving and driven members, and further provided with a drive shaft, said mechanism including a plurality of clutch operating motor members fixedly secured to the driving clutch member and further including fluid transmitting connections connected with said cylinder members, said connections comprising two ported collar members mounted directly on said drive shaft, fluid transmitting grooves in said shaft registering with the ports of the collar members, interconnecting bores in said shaft communicating with said grooves, a separate conduit extending between each of said cylinders and one of said collars, and a conduit extending from the other of said collars.

15. Clutch controlling mechanism for an automotive vehicle provided with a clutch comprising driving and driven members, and further provided with a drive shaft, said mechanism including a plurality of clutch operating motor members fixedly secured to the driving clutch member, said motor members each including a cylinder member and a power element, a pressure plate secured to said power elements, said controlling mechanism further including fluid transmitting connections connected with said cylinder members, said connections comprising two ported collar members mounted directly on said drive shaft, fluid transmitting grooves in said shaft registering with the ports of the collar members, interconnecting bores in said shaft communicating with said grooves, a separate conduit extending between each of said cylinders and one of said collars, and a conduit extending from the other of said collars, said clutch controlling mechanism further including lever members mounted on said clutch driving member and contactible with the aforementioned pressure plate, and manually operated force transmitting means extending through said driving member and acting on said lever members whereby the clutch may be disengaged and engaged either manually or by power.

16. Clutch control mechanism for an automotive vehicle provided with a clutch and an accelerator, said mechanism comprising a vacuum operated motor operably connected to the clutch, and a control valve for said motor, said valve comprising a pressure differential operated plunger member controlled by movement of the accelerator, said valve being operable to either progressively energizing or deenergizing said motor to progressively disengage or engage the clutch.

ROY S. SANFORD.